(12) United States Patent
Ootsuka

(10) Patent No.: US 6,524,222 B2
(45) Date of Patent: Feb. 25, 2003

(54) SYNCHRONOUS MESH-TYPE AUTOMATIC TRANSMISSION CONTROL SYSTEM

(75) Inventor: Toshio Ootsuka, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/858,890

(22) Filed: May 17, 2001

(65) Prior Publication Data
US 2002/0055414 A1 May 9, 2002

(30) Foreign Application Priority Data
Nov. 7, 2000 (JP) ........................................ 2000-339191

(51) Int. Cl.[7] ............................................... B60K 41/04
(52) U.S. Cl. ..................................................... 477/109
(58) Field of Search ................................ 477/107, 109, 477/111

(56) References Cited

U.S. PATENT DOCUMENTS

| | | | | |
|---|---|---|---|---|
| 4,493,228 A | * | 1/1985 | Vukovich et al. | 477/111 |
| 4,593,580 A | * | 6/1986 | Schulze | 477/109 |
| 4,881,428 A | * | 11/1989 | Ishikawa et al. | 477/109 |
| 6,267,707 B1 | * | 7/2001 | Bock | 477/109 |

FOREIGN PATENT DOCUMENTS

JP         60-35633        2/1985

* cited by examiner

Primary Examiner—Dirk Wright
(74) Attorney, Agent, or Firm—Sughrue Mion, PLLC

(57) ABSTRACT

The present invention provides a synchronous mesh-type automatic transmission control system wherein a generation of a transmission shock or a wrongness feeling to a driver is avoidable by always keeping a settling time of a throttle opening to approximately a constant value in any driving conditions during a speed change operation.

The synchronous mesh-type automatic transmission control system comprises a transmission 3 coupled with a internal combustion engine 1 through an electro-magnetic clutch 2, the transmission 3 with the plural sets of gears having a different gear ratio, a shift-select actuator 5 for changing any set of gears of the transmission 3, and a control unit 4 wherein the control unit controls the speed shift operation of the transmission 3 based on a predetermined program, computes an target throttle opening, detects the actual throttle opening and manipulates the throttle actuator 11 for moving the throttle toward a target throttle opening with a speed determined based on a difference of the target and the actual throttle opening as soon as the gear change operation is finished.

2 Claims, 5 Drawing Sheets

SYNCHRONOUS MESH-TYPE AUTOMATIC TRANSMISSION CONTROL SYSTEM

TECHNICAL FIELD

This invention relates to an automatic transmission control system, and more particularly to a synchronous mesh-type automatic transmission control system for an automotive vehicle, wherein an actual throttle opening of an internal combustion engine is capable of being set equal to a target throttle opening in a short period of time during a speed shift operation.

BACKGROUND ART

A control device concerning a clutch and a throttle operation is disclosed in Japanese laid-open Patent No.60-35633 as an example of a prior art in this field. In the control device disclosed in this prior art, a clutch releasing speed and a throttle closing speed are controlled to prevent a shock or an engine blow-up while the clutch is being released at the outset of a speed shift operation. In more detailed description, the control device comprises a clutch actuator for controlling a release-connect operation of the clutch, a throttle control means for controlling an open-close operation of the throttle and a control unit. The control unit stores a clutch map ruling a clutch releasing speed in terms of an accelerator position detected, a throttle map ruling a throttle closing speed in terms of the accelerator position detected, and controls a throttle closing speed as well as a clutch releasing speed referring to the above maps by the clutch actuator and the throttle control means in a speed shift operation.

As above explained in an automatic transmission for an automotive vehicle in the prior art, the throttle opening is usually controlled based on the accelerator position as a parameter at the time of starting the speed shift operation. In this operation, a throttle moving speed is fixed once the speed shift operation has started. Therefore, when an accelerator is manipulated while the automatic transmission is functioning after it has started, it could take an extra time for setting the throttle opening if the accelerator is further stepped down, or a shock due to an instant speed transfer could occur if the accelerator is loosened, and both of these phenomena can be the cause of a wrongness feeling to a driver.

SUMMARY OF THE INVENTION

In view of the above, it is object of the present invention to provide a synchronous mesh-type automatic transmission control system for an automotive vehicle wherein a shock or a wrongness feeling for the driver is avoidable by keeping a setting time of a throttle opening approximately constant even when an accelerator is manipulated by the driver during a speed shift operation.

A synchronous mesh-type automatic transmission control system for an automotive vehicle comprises:

a transmission coupled with an internal combustion engine through an electro-magnetic clutch, and provided with the plural sets of gears having a different gear ratio with each other, a shift-select actuator for coupling a set of gears selected from the plural sets of gears, a throttle moved by a throttle actuator for controlling a rotating speed of the internal combustion engine by adjusting an intake air flow into the internal combustion engine, a throttle actuator for controlling the throttle based on a stepped-down quantity of an acerator and a stored program for speed shift operation, and, a control means supplies a signal to the shift-select actuator in order to control a speed shift operation by changing the plural sets of gears, and computes a target throttle opening and a throttle moving speed from a difference of an actual and the target throttle opening wherein said control means controls the actual throttle opening depending on the throttle moving speed to transfer to the target throttle opening by controlling the throttle actuator after a gear change operation is completed.

Also in the synchronous mesh-type automatic transmission control system for the automotive vehicle, the control means determines the throttle moving speed periodically based on a control map stored in the control means.

Therefore, it is possible to provide the synchronous mesh-type automatic transmission control system as a required time for the throttle to move to the target throttle opening can be approximately constant regardless of the present actual throttle opening. Also the shock when the gear change operation is completed is capable of being prevented, and the wrongness feeling to the driver due to the prolonged time for setting the throttle opening is avoidable with the control system.

Furthermore, the larger is the difference of the actual and the target throttle opening, the larger the manipulating speed of the throttle becomes, and then the actual throttle moving speed is gradually slowed down as the throttle opening nears the aimed throttle opening. Accordingly, the throttle moving speed is capable of being controlled stably without an overshooting action.

DETAILED DESCRIPTION OF THE PREFERRED EMBODIMENT

Figure 1:
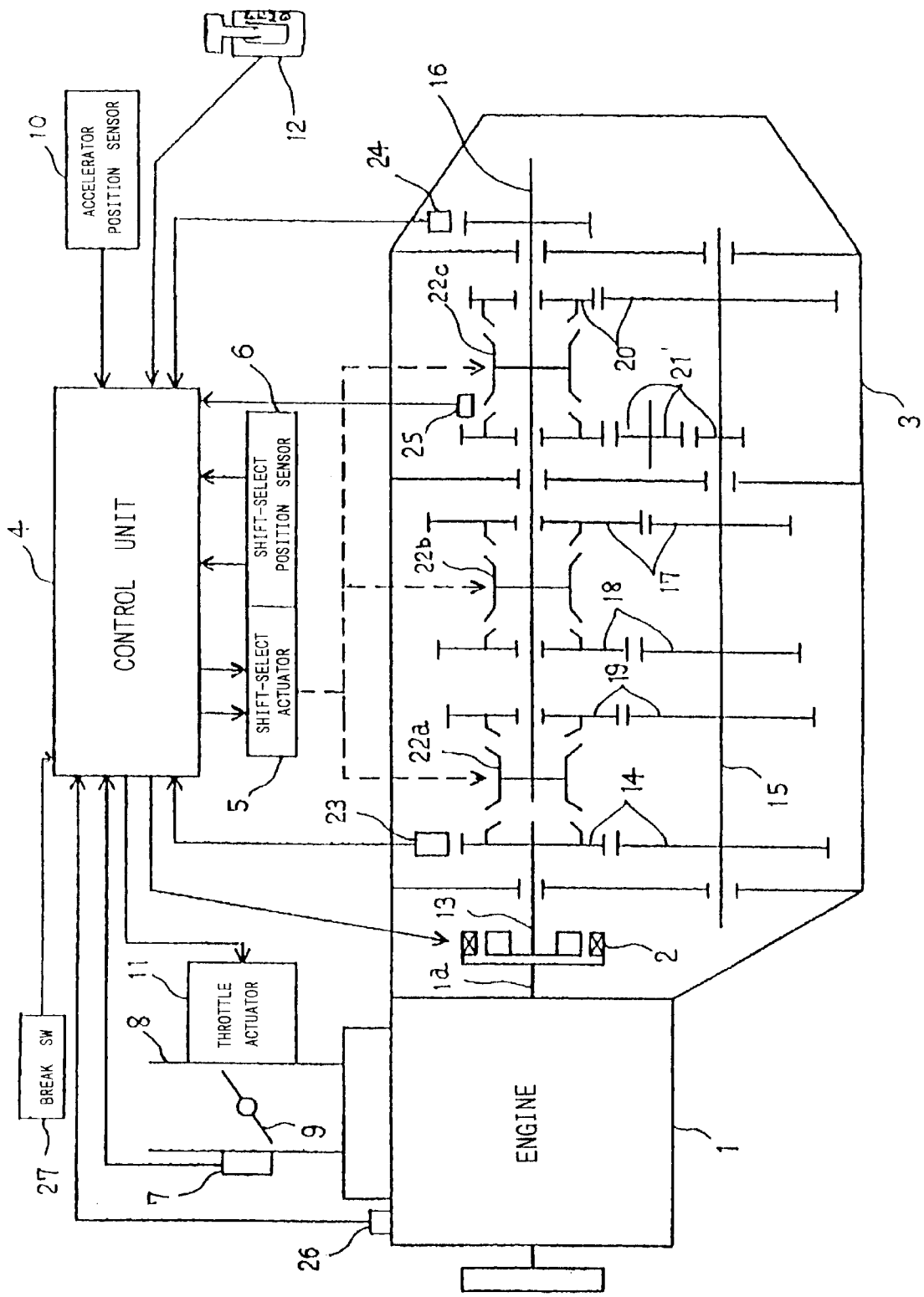
FIG. 1 is a configuration of a synchronous mesh-type automatic transmission control system in an embodiment 1 according to the present invention.
Figure 2:
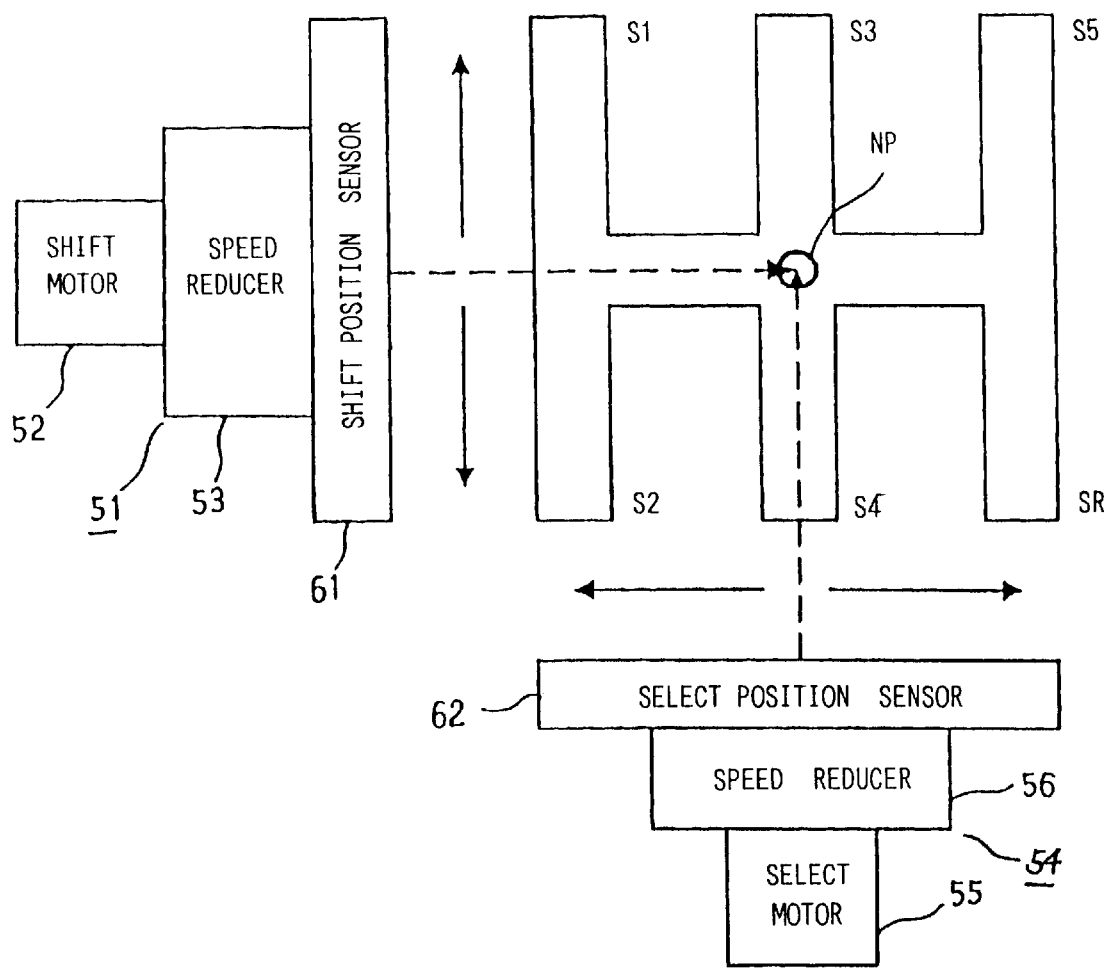
FIG. 2 is a configuration for explaining a transmission mechanism of the synchronous mesh-type automatic transmission control system in the embodiment 1 according to the present invention.
Figure 3:
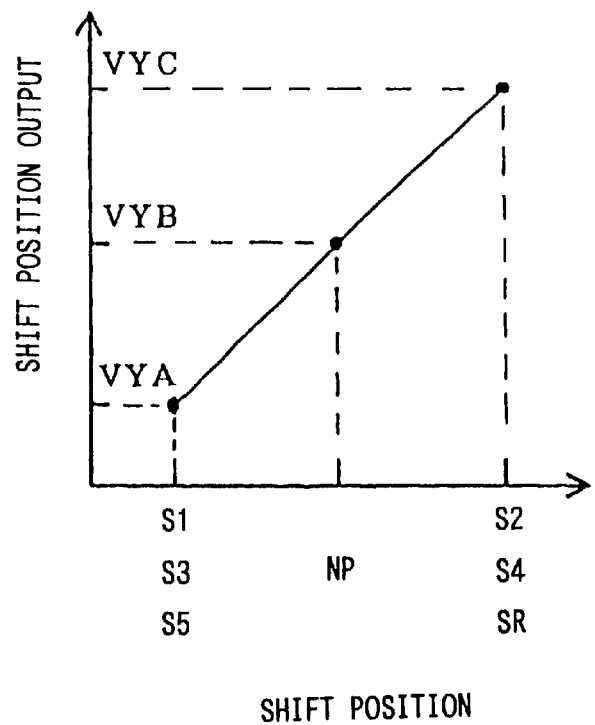
FIG. 3 is a characteristic graph for explaining a function of the synchronous mesh-type automatic transmission control system in the embodiment 1 according to the present invention.
Figure 4:
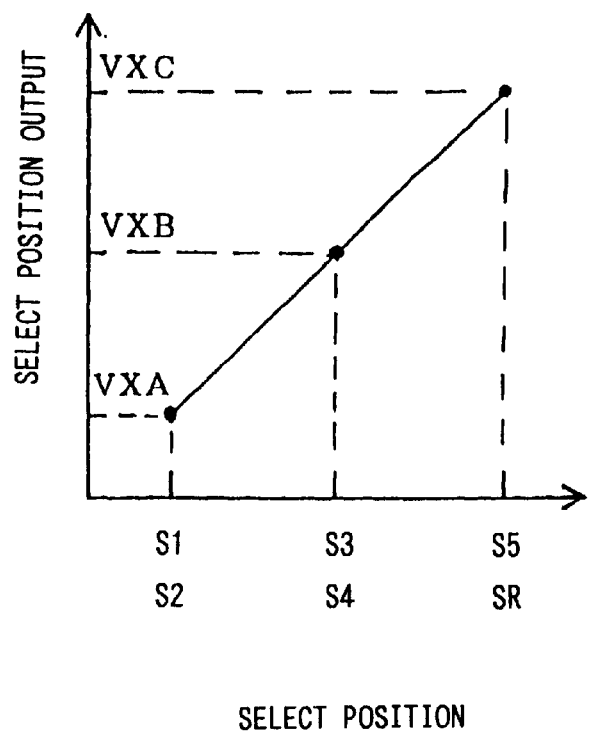
FIG. 4 is a characteristic graph for explaining a function of the synchronous mesh-type automatic transmission control system in the embodiment 1 according to the present invention.
Figure 5:
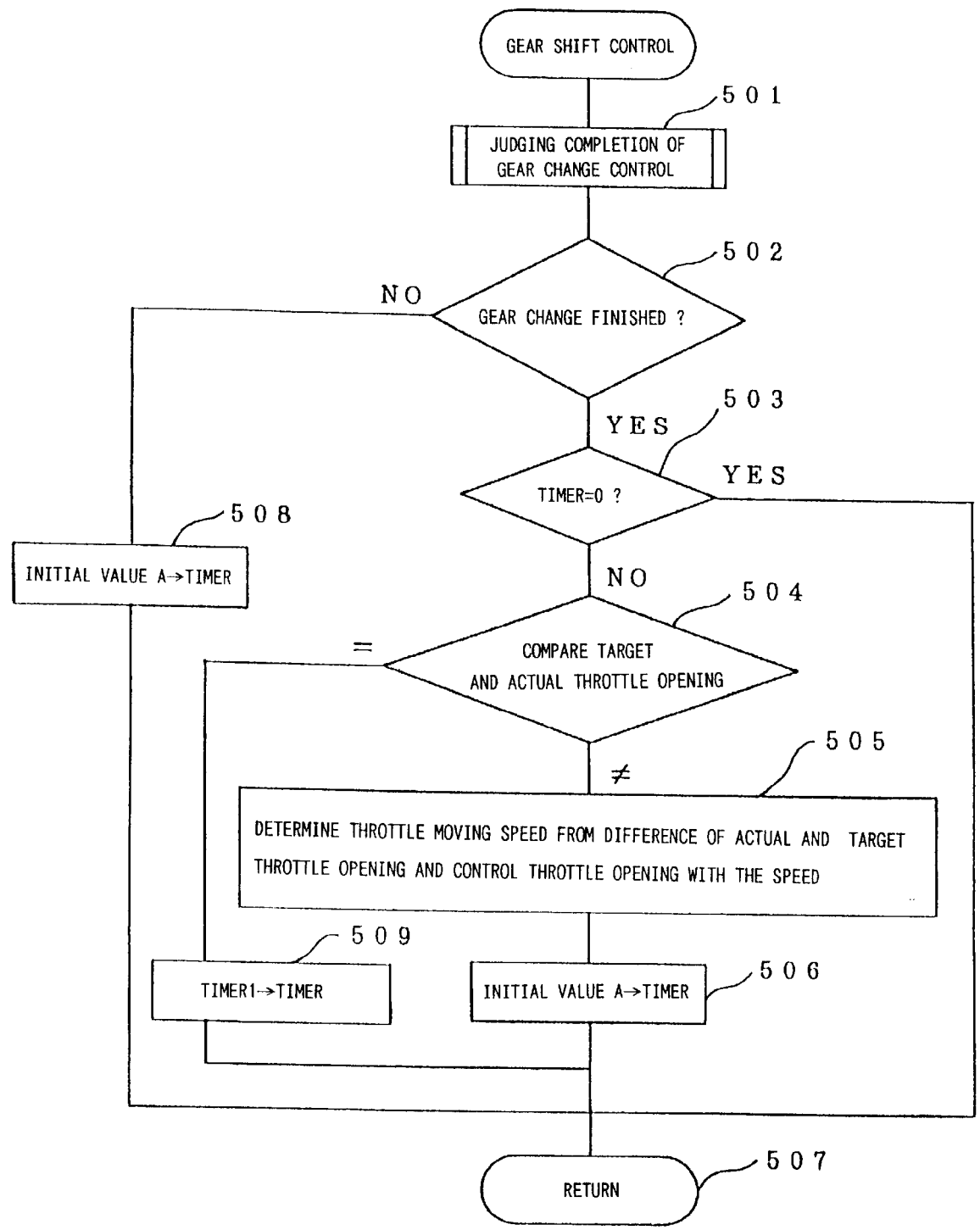
FIG. 5 is a flowchart for explaining a function of the synchronous mesh-type automatic transmission control system in the embodiment 1 according to the present invention.
Figure 6:
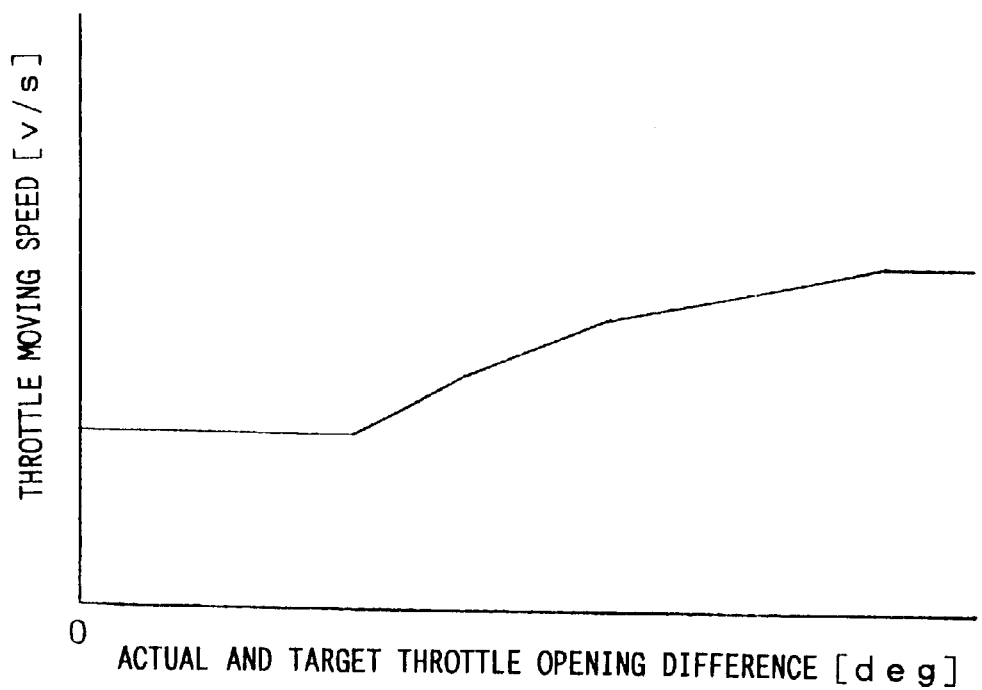
FIG. 6 is an example of a characteristic graph for throttle operation of the synchronous mesh-type automatic transmission control system in the embodiment 1 according to the present invention.

FIG. 1 to FIG. 6 is for explaining a configuration and an operation of a synchronous mesh-type automatic transmission control system in the embodiment 1 according to the present invention. Namely, FIG. 1 is a configuration of a synchronous mesh-type automatic transmission control system, FIG. 2 is a configuration for explaining a transmission mechanism, FIG. 3 and FIG. 4 are the characteristic graphs for explaining a function, FIG. 5 is a flowchart for explaining a function and FIG. 6 is an example of a characteristic graph for throttle operation.

In FIG. 1, an internal combustion engine 1 is laden in an automotive vehicle, an electro-magnetic clutch 2 set up with a crank shaft 1a of the internal combustion engine 1 is for coupling the internal combustion engine 1 with the synchronous mesh-type automatic transmission 3, a control unit 4 as a control means is for controlling the synchronous mesh-type automatic transmission 3, a shift-select actuator 5 controlled by the control unit 4 is for controlling a gear coupling of the synchronous mesh-type automatic transmission 3, a shift-select position sensor 6 is for detecting a manipulated position of the shift-select actuator 5, a throttle position sensor 7 located in an intake 8 of the internal combustion engine 1 is for detecting an opening of a throttle 9, an accelerator position sensor 10 is for detecting a stepped-down quantity of an accelerator not shown in the drawings, a throttle actuator 11 is for moving the opening of the throttle 9 by the control unit 4 depending on an output from the accelerator position sensor 10 in usual running or according to a stored program in a speed shift operation, and a shift lever 12 is for commanding a shift operating position by a driver to the control unit 4.

The synchronous mesh-type automatic transmission 3 comprises an input shaft 13 coupled with the electro-magnetic clutch 2, a counter shaft 15 coupled with the input shaft 13 through a primary gear set 14, an output shaft 16 for driving the automotive vehicle, the set of gears such as the $1^{st}$ speed gear set 17, the $2^{nd}$ speed gear set 18, the $3^{rd}$ speed gear set 19, the $5^{th}$ speed gear set 20 and a reverse gear set 21 set up respectively as a pair of gears between the counter shaft 15 and the output shaft 16, and a coupling mechanism 22a, 22b and 22c fixed to a rotating direction as well as movable along an axial direction of the output shaft 16. One gear on a side of the counter shaft 15 of the gear set 17, 18, 19, 20 and 21 is fixed to the counter shaft 15, and the other gear of the same gear sets on a side of the output shaft 16 is installed free of rotation to the output shaft 16, and is separately coupled with the output shaft 16 by linking with the coupling mechanism 22a, 22b or 22c.

An input shaft rotating speed sensor 23 is for detecting a rotating speed of the input shaft 13, and an output shaft rotating speed sensor 24 is for detecting a rotating speed of the output shaft 16. A reverse gear switch 25 is for detecting a completion of coupling between the coupling mechanism 22c and the reverse gear set 21, an engine rotating speed sensor 26 is for detecting a rotating speed of the internal combustion engine 1, and a brake switch 27 is for detecting a braking action by the driver. Moreover, the electro-magnetic clutch 2 which is controlled by the control unit 4 generates a transmission torque proportional to its exciting current, and transfers or cuts off power between the crank shaft 1a of the internal combustion engine 1 and the input shaft 13 of the synchronous mesh-type automatic transmission 3.

The configuration for explaining an outlined operation of the synchronous mesh-type automatic transmission 3 by the shift-select actuator 5 is shown in FIG. 2.

The shift-select actuator 5 comprises a shift actuator 51 and a select actuator 54. The shift actuator 51 comprises a shift motor 52 and a speed reducer 53, and shifts the coupling mechanism 22a, 22b or 22c to 3 positions such as the $1^{st}$, the $3^{rd}$ or the $5^{th}$ speed position by detecting a shift position from an output of a shift position sensor 61. The select actuator 54 comprises a select motor 55 and a speed reducer 56, and selects the coupling mechanism 22a, 22b or 22c by detecting a select position from an output of a select position sensor 62.

The gear set 17, 18, 19 and 20 respectively having a different gear ratio are for advancing, and a configuration in case of 5-stage advancing with 1-stage reversing is shown as an example in the embodiment 1. Any one of the coupling mechanism 22a, 22b and 22c fixes one of the gear set 17, 18, 19, 20 and 21 with the output shaft 16. Namely, the coupling mechanism 22a is set up between the primary gear set 14 and the $3^{rd}$ speed gear set 19, the coupling mechanism 22b is set up between the $1^{st}$ speed gear set 17 and the $2^{nd}$ speed gear set 18, and the coupling mechanism 22c is set up between the $5^{th}$ speed gear set 20 and the reverse speed gear set 21. In this configuration, any one of the coupling mechanism 22a, 22b and 22c is selected by the select actuator 54, and is transferred to its either side along the axial direction of the output shaft 16, thus any one gear set from the $1^{st}$ to the $5^{th}$ speed gear set, the reverse gear set or a neutral position is selected. Additionally, in a configuration of FIG. 1 as the embodiment 1, the $4^{th}$ speed selection is realized by coupling the primary gear set 14 with the output shaft 13 through the coupling mechanism 22a.

FIG. 3 shows a relationship between the shift position and an output voltage of the shift position sensor 61, and FIG. 4 shows a relationship between the select position and an output voltage of the select position sensor 62. The shift position sensor 61 outputs a voltage VYA when the coupling mechanism 22a, 22b, or 22c is on a side of the $1^{st}$ speed position S1, the $3^{rd}$ speed position S3 or the $5^{th}$ speed position S5, and the voltage VYA becomes a target position voltage during a shift control operation by the control unit 4. Similarly, a voltage VYB or a voltage VYC is output and used as a target position voltage according to when the coupling mechanism 22a, 22b and 22c are at the neutral position NP or when the same coupling mechanism is on a side of the $2^{nd}$ speed position S2, $4^{th}$ speed position S4 or the reverse speed position RS. Furthermore, the select position sensor 62 generates a voltage VXC to be used as a target position voltage when the coupling mechanism 22c is selected for switching between the $5^{th}$ speed and the reverse speed position. Similarly, a voltage VXB or a voltage VXA is output and used as the target position voltage according to when the coupling mechanism 22a is selected for switching between the $3^{rd}$ and the $4^{th}$ speed position or when the coupling mechanism 22b is selected for switching between the $1^{st}$ and the $2^{nd}$ speed position.

The speed shift operation by the control unit 4 is executed, wherein a position signal of the shift lever 12, a signal of the accelerator position sensor 10, the rotating speed signals from the input shaft rotating speed sensor 23, the output shaft rotating speed sensor 24 and the engine rotating speed sensor 26 are input to the control unit 4. And according to these signals, the control unit 4 determines a transmission stage suitable for the running conditions based on a stored shift pattern, and controls the shift-select actuator 5 while detecting a shift and a select position by the-select position sensor 6. For example, when a speed position is changed from the $2^{nd}$ speed position to the $3^{rd}$ speed position, the shift-select actuator 5 releases the $2^{nd}$ speed gear set 18 from the coupling mechanism 22b, the select actuator 54 selects the coupling mechanism 22a corresponding to a target transmission stage, and then the shift actuator 51 shifts the coupling mechanism 22a for coupling with the $3^{rd}$ speed gear set 19, and a transmission operation is complete.

In this operation a synchronizing mechanism not shown in the drawing is operated, and the coupling mechanism 22a and the $3^{rd}$ speed gear set as the target transmission stage is brought into a state of a synchronized rotation. A synchronized rotating condition is detected by the input shaft rotating speed sensor 23 and the output shaft rotating speed sensor 24. And when the synchronizing rotation is completed, the coupling mechanism 22a is finally transferred to couple with the 3$^{rd}$ speed gear set 19. The shift operation just mentioned is carried out in a state, wherein the control unit 4 decreases an opening of the throttle 9 to the predetermined position, and also cuts off an exciting current of the electro-magnetic clutch 2, which causes the synchronous mesh-type automatic transmission 3 to be disconnected from a driving power of the internal combustion engine 1. After the shift operation is completed, or after the coupling mechanism 22a has finished coupling with the 3$^{rd}$ speed gear set 19, a coupling force of the electro-magnetic clutch 2 is gradually increased by controlling the rotating speed of the internal combustion engine 1 based on the exciting current of the electro-magnetic clutch 2 and the opening of the throttle 11.

A control operation of the control unit 4 after the coupling mechanism 22a, 22b or 22c has completed linking with a target speed gear set is carried out according to a process shown in a flowchart of FIG. 5. In this flowchart, step 501 is for judging a completion of a transmission speed control in a control routine, and a subroutine including steps following step 501 is for processing after the above completion is judged. In step 502 whether or not the completion of the transmission speed control, that is, a gear change operation is attained is judged. A judgment whether or not the gear change operation has completed is executed based on the synchronized rotating condition or the position of the shift-select actuator 5 detected by the shift-select position sensor 6, wherein the judgment is done by reading the voltage of the shift position and the select position signal as shown in FIG. 3 and FIG. 4.

In step 502 if the gear change operation is judged to be finished, a process advances to step 503 and whether or not a timer is 0 is judged. If the timer is not 0, an actual throttle opening detected by the throttle position sensor 7 and a target throttle opening computed by the control unit 4 are compared in step 504. If the compared result is not equal, a process advances to step 505, wherein a throttle moving speed is determined from a pre-stored map of the throttle moving speed in terms of a difference between the actual and the target throttle opening. And the throttle moving speed signal is delivered to the throttle actuator 11 from the control unit 4 for controlling the throttle 9 to become the target opening with the given moving speed. In step 506 the timer is set to an initial value a, and a routine advances to step 507 for returning to the initial step. If the gear change operation is judged not to be finished in step 502, a process advances to step 508 and the timer is set to the initial value a to be ready for a completion of the gear change operation. If the actual throttle opening is equal to the target throttle opening in step 504, the timer is decreased by 1 and jumps to step 507 when it becomes 0.

A characteristic curve relating the throttle moving speed with the difference between the target and the actual throttle opening, for example, is memorized as a map in the control unit 4 as shown in FIG. 6, and the larger is the difference of the throttle opening, the larger the throttle moving speed for setting becomes in a range wherein the difference of the actual and the target throttle opening is larger than the predetermined value. Moreover, as the timer is set to the initial value a in step 506 and a process returns in step 507, a throttle moving operation in step 505 is to be repeated until the timer becomes 0 in step 509 after the actual and the target throttle opening are judged to be equal each other. Namely, in this process of setting the throttle moving speed, the larger is the difference of the actual and the target throttle opening, the larger the throttle moving speed for setting becomes, and the moving speed is kept to the predetermined smaller constant value as the actual throttle opening approaches the target throttle opening.

As is heretofore mentioned, the larger is the difference between the actual and the aimed throttle opening, the larger the throttle moving speed for setting becomes, and the moving speed becomes smaller as the actual throttle opening approaches the target throttle opening. Therefore, even in cases such as when the accelerator is stepped down or loosened by the driver while the speed change operation is underway, the actual throttle opening is moved to reach the target throttle opening in approximately the same time regardless of the actual throttle opening, and the electro-magnetic clutch 2 is started to be energized just after the actual throttle opening became equal to the target throttle opening.

In this way, a generation of a shock of an instant coupling by exciting the electro-magnetic clutch 2 in a condition wherein the difference of the actual and the target throttle opening is small just after the gear change operation is completed can be prevented. At the same time, a wrongness feeling to the driver due to a prolonged time in setting the throttle opening is avoidable when the difference of the actual and the target throttle opening is large.

What is claimed is:

1. A synchronous mesh-type automatic transmission control system for an automotive vehicle comprising:

a transmission coupled with an internal combustion engine through an electro-magnetic clutch, and provided with the plural sets of gears having a different gear ratio with each other, a shift-select actuator for coupling a set of gears selected from the plural sets of gears, a throttle moved by a throttle actuator for controlling a rotating speed of the internal combustion engine by adjusting an intake air flow into the internal combustion engine, a throttle actuator for controlling said throttle based on a stepped-down quantity of an accelerator and a stored program for speed shift operation, and, a control means supplies a signal to the shift-select actuator in order to control a speed shift operation by changing said plural sets of gears, and computes a target throttle opening and a throttle moving speed from a difference of an actual and said target throttle opening, wherein said control means controls said actual throttle opening depending on said throttle moving speed to transfer to said target throttle opening by controlling said throttle actuator after a gear change operation is competed so that said throttle moving speed becomes larger as the difference between said actual and said target throttle opening becomes larger, and said throttle moving speed becomes smaller as said actual throttle opening approaches said target throttle opening, whereby said actual throttle opening is moved to reach the target throttle opening in approximately the same time, regardless of the actual throttle opening.

2. The synchronous mesh-type automatic transmission control system for the automotive vehicle according to claim 1, wherein said control means determines said throttle moving speed periodically based on a control map stored in said control means.

* * * * *